United States Patent [19]

Norian

[11] 3,882,272

[45] May 6, 1975

[54] CARRIER DETECTOR

[75] Inventor: Roger F. Norian, Dallas, Tex.

[73] Assignee: Xerox Corporation, Stamford, Conn.

[22] Filed: Dec. 21, 1973

[21] Appl. No.: 427,157

[52] U.S. Cl.......... 178/7.3 R; 178/DIG. 12; 178/88; 325/364; 325/466; 325/473

[51] Int. Cl............................................. H04b 1/16

[58] Field of Search............ 178/7.3 R, 88, DIG. 12, 178/6, DIG. 15; 325/65, 466, 389–392, 473, 487, 320, 364; 340/171 R

[56] References Cited

UNITED STATES PATENTS

| | | | |
|---|---|---|---|
| 3,593,151 | 7/1971 | Veale | 325/466 |
| 3,602,821 | 8/1971 | Juroff | 325/364 |
| 3,711,777 | 1/1973 | Tink | 178/88 |
| 3,714,586 | 1/1973 | Mason | 178/88 |
| 3,772,456 | 11/1973 | Richeson, Jr. et al. | 178/88 |

*Primary Examiner*—Robert L. Griffin
*Assistant Examiner*—Jin F. Ng

[57] ABSTRACT

A facsimile receiver wherein a negative peak detector is utilized at the input to the carrier detector circuit to enhance the system's immunity to noise.

2 Claims, 2 Drawing Figures

CARRIER DETECTOR

BACKGROUND OF THE INVENTION

This invention relates to data communications systems and, more particularly, to improved circuitry for detecting the presence of a transmitted carrier signal in the presence of noise.

In the data communications art it is common to transmit data in the form of an information signal modulating a carrier signal. Apparatus is typically provided which detects the absence of a carrier signal for a predetermined time to effect the shut-off of receiving equipment. The typical prior art carrier detector circuitry senses the average value of the recovered baseband data signal from the communications channel. In the event that the communications channel is noisy, it is possible in the prior art circuitry for the carrier detector circuit to interpret the noise signal as carrier and not shut off the equipment even though carrier is absent. It is therefore an object of this invention to provide circuitry to eliminate the noise sensitivity of the carrier detector circuitry.

SUMMARY OF THE INVENTION

In accordance with the principles of this invention, improved circuitry is provided which senses and holds negative peaks of the noise to prevent the carrier detector circuit from averaging the noise signal in the absence of the carrier signal. The circuitry is such that the greater the noise amplitude in the communication channel, the less sensitive the carrier detector circuit will be to the noise.

DESCRIPTION OF THE DRAWING

The foregoing will be more readily apparent upon reading the following description in conjunction with the accompanying drawing in which.

DESCRIPTION OF THE ILLUSTRATIVE EMBODIMENT

Figure 1:
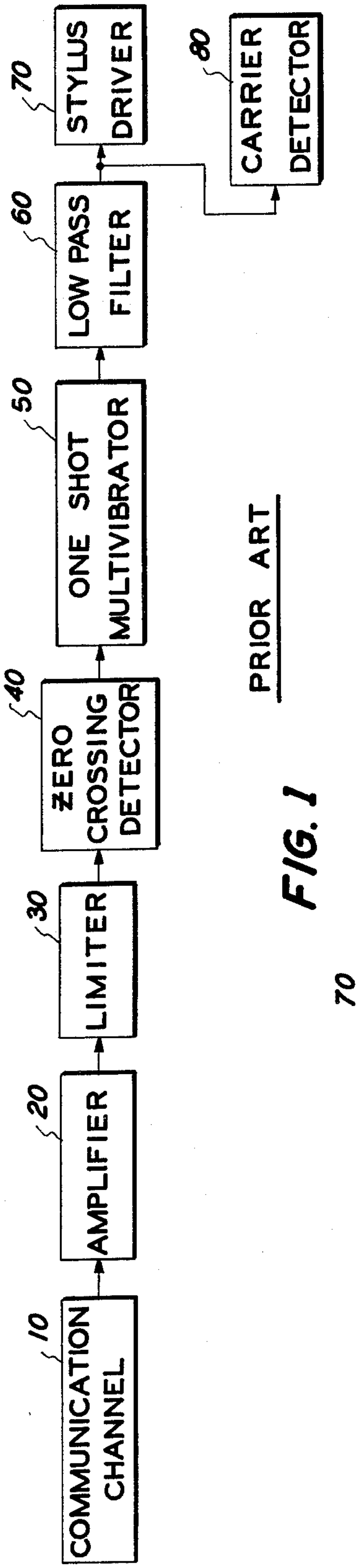
FIG. 1 depicts a block diagram of a prior art facsimile receiving system.

Turning now to FIG. 1, depicted therein is a block diagram of a typical prior art facsimile receiver circuit, such as may be found in the Telecopier III manufactured by Xerox Corporation. Communication channel 10 to which facsimile receiver is connected is typically a telephone line. The connection between communication channel 10 and amplifier 20 is by means of an acoustic coupler or a data access arrangement. A signal on communication channel 10 is amplified in amplifier 20 and amplitude limited in limiter 30. It then passes through zero crossing detector 40, one-shot multivibrator 50, and low-pass filter 60. The output of low-pass filter 60 is divided. One portion goes to stylus driver 70 where it is utilized to write on a recording medium. The other portion of the output of filter 60 goes to carrier detector 80. The function of carrier detector 80 is to determine whether the carrier signal is present. If the carrier signal is not present, carrier detector 80 generates a signal which results in inactivating the facsimile transceiver. To make the decision as to whether carrier is present, carrier detector 80 examines the average DC value at the output of low-pass filter 60.

If this value is above a predetermined threshold level, the decision is made by carrier detector 80 that carrier is present. If the average DC value is below the predetermined threshold level, carrier detector 80 generates the signal to shut off the facsimile transceiver.

Normally, the signal transmitted in communication channel 10 comprises a carrier (or modulation) signal plus superimposed noise. The carrier detector therefore normally examines carrier plus noise and compares the average level of the carrier plus noise signal against the predetermined threshold level. At the end of a transmission, there no longer is any carrier signal present. However, the noise in the channel remains. It is therefore possible that the carrier detector 80 may average the noise signal which may actually be greater than the predetermined threshold level. The carrier detector therefore makes the erroneous decision that carrier is still present and fails to turn off the facsimile transceiver.

Figure 2:
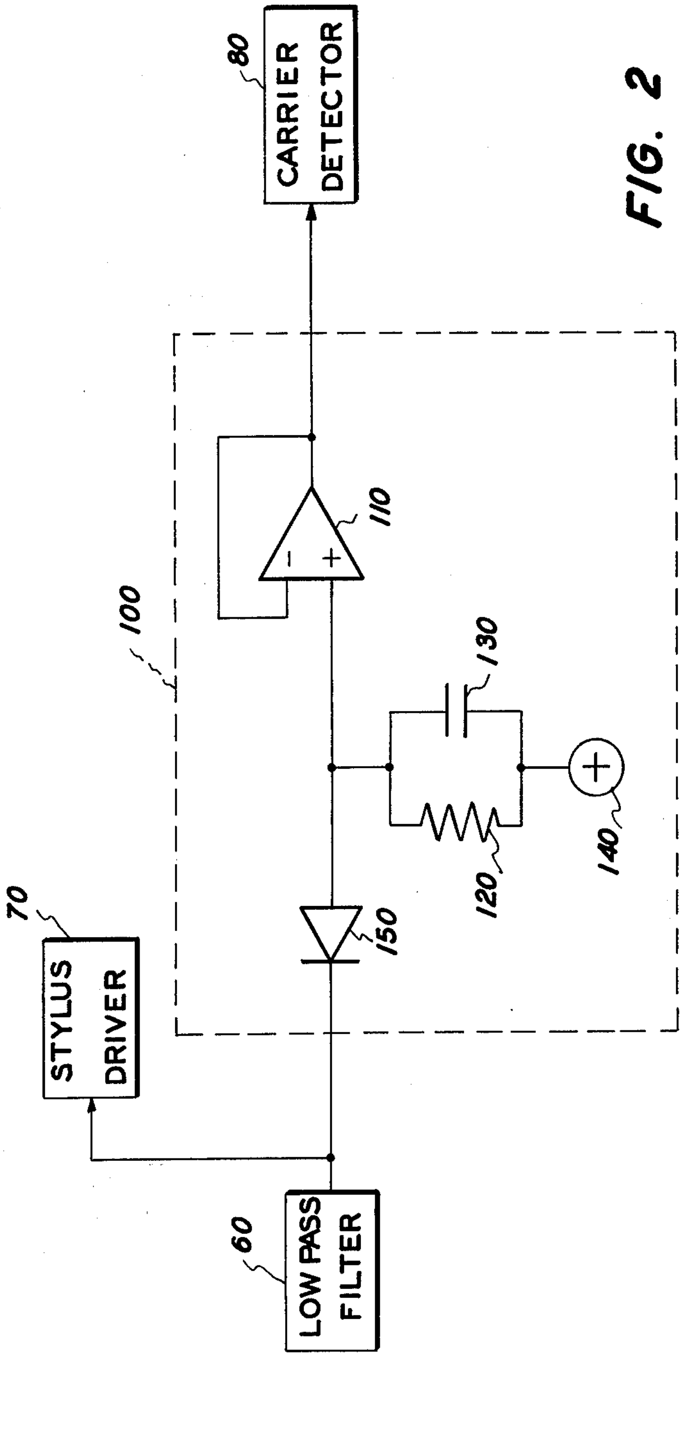
FIG. 2 depicts a portion of the facsimile receiving system of FIG. 1 with the addition of improved circuitry operating in accordance with the principles of the invention.

Turning now to FIG. 2, shown therein is an illustrative circuit 100 embodying the principles of this invention. This illustrative circuit 100 is inserted in the prior art facsimile receiver circuitry between the output of low-pass filter 60 and carrier detector 80. Circuit 100 is a negative peak detector with a response time which is long compared with the fluctuations of the noise so that fast noise pulses are unable to pass through and affect the average value looked at by carrier detector 80. Peak detector 100 comprises a unity gain amplifier 110 having at its input the parallel combination of resistor 120 and capacitor 130 biased by source 140. Connected between this parallel RC network and low-pass filter 60 is diode 150.

Let us assume that carrier detector 80 is looking for a voltage level at its input greater than some voltage V1. Carrier signal may have left the transmission system, but the noise level could have an average value above V1. The noise is a fluctuating signal superimposed upon a DC level. The first negative peak of the noise signal causes a discharge of capacitor 130 through diode 150 into the source impedance of the low pass filter. When the noise signal goes up, the diode is turned off and capacitor 130 begins to charge up from supply 140 through resistor 120. However, the value of resistor 120 is chosen so that capacitor 130 charges very slowly. Since the noise signal varies rapidly relative to the time constant of the RC network, the next negative peak of the noise signal will occur before capacitor 130 has recharged. This will cause capacitor 130 to again discharge through diode 150. In other words, the negative peaks of the noise signal keep the level at the input to amplifier 110 at the low voltage of the negative peaks of the noise without letting this signal get to the value of the positive peaks of the noise. In the prior art system of FIG. 1, the more noise that was at the input to carrier detector 80, the easier it was to falsely detect carrier. With the addition of negative peak detector 100 as shown in FIG. 2, the more noise there is on the line, the more noise immune the system becomes because it tries to maintain a lower level in the absence of carrier.

It is understood that the above-described arrangement is merely illustrative of the application of the principles of my invention. Numerous other arrangements may be devised by those skilled in the art without departing from the spirit and scope of this invention.

What is claimed is:

1. In a facsimile receiver arranged for connection to a communication channel and responsive to signals on said channel to provide a facsimile of an original scanned document, said receiver including carrier detector means responsive to the average level of the signals on said channel for generating a shut-down signal for the inactivation of said receiver when said average level falls below a predetermined value, the improvement comprising negative peak detector means connected to the input of said carrier detector means and responsive to fluctuations of the level of signals on said channel for maintaining the level at the input to said carrier detector means at substantially the negative peaks of said fluctuations.

2. The improvement as set forth in claim 1 wherein said negative peak detector means includes am amplifier having an input terminal and an output terminal connected to the input of said carrier detector means, a biased parallel resistor-capacitor network connected to said input terminal of said amplifier, and a diode connected between said input terminal of said amplifier and said channel, said diode being poled so as to discharge said capacitor when the signal level on said channel falls below a predetermined value.

* * * * *